United States Patent
King, Jr.

(10) Patent No.: US 6,363,579 B1
(45) Date of Patent: Apr. 2, 2002

(54) ERGONOMIC HAND ATTACHABLE DRAIN VALVES

(75) Inventor: Lloyd Herbert King, Jr., Wildwood, MO (US)

(73) Assignee: King Technology of Mo. Inc, St. Charles, MO (US)

( * ) Notice: Subject to any disclaimer, the term of this patent is extended or adjusted under 35 U.S.C. 154(b) by 0 days.

(21) Appl. No.: 09/569,223

(22) Filed: May 11, 2000

Related U.S. Application Data

(60) Provisional application No. 60/136,093, filed on May 26, 1999.

(51) Int. Cl.$^7$ .................................................. E05B 1/00
(52) U.S. Cl. .............................. 16/441; 16/430; 16/433
(58) Field of Search .................. 16/441, 433, 417, 16/DIG. 19, DIG. 30, 2.3, 2.4, 2.5, 430; 74/551.9, 553; D8/313, 312; D23/257, 250

(56) References Cited

U.S. PATENT DOCUMENTS

| | | | | |
|---|---|---|---|---|
| 3,267,960 A | | 8/1966 | Warburton | 137/517 |
| 3,779,276 A | * | 12/1973 | King, Sr. | 251/145 |
| 3,887,963 A | * | 6/1975 | Harmon et al. | 16/441 |
| 4,094,210 A | * | 6/1978 | Wirtz et al. | 16/441 |
| 4,172,583 A | * | 10/1979 | Wrasman | 251/172 |
| D268,517 S | * | 4/1983 | Thompson | D8/312 |
| D276,838 S | * | 12/1984 | Hill et al. | 16/441 |
| 4,512,547 A | * | 4/1985 | Balch | 251/115 |
| 4,953,581 A | | 9/1990 | Patterson | 137/107 |
| 5,480,273 A | * | 1/1996 | Jou | 16/441 |
| D378,269 S | * | 3/1997 | Doughty et al. | D8/307 |
| 5,640,991 A | | 6/1997 | King | 137/107 |
| D389,394 S | * | 1/1998 | Taylor | D8/312 |

OTHER PUBLICATIONS

Fig. 1A–Fig. 1B Drain sold by Aspen Earth, 387 West 5900 South Murray Utah 84107.

Fig. @A–Fig. @B Drain sold by King Brothers Industries, 27781 Avenue Hopkins, Valencia California 91355.

Fig. 3A–Fig. 3B Drain sold by Orbit Underground Sprinkles, P.O. Box 328, Bountiful Utah.

\* cited by examiner

*Primary Examiner*—Chuck Y. Mah
(74) *Attorney, Agent, or Firm*—Jacobson & Johnson

(57) ABSTRACT

A hand attachable drainage valve having diagonally opposite ears with inwardly curved finger grasping areas between the ears to permit user with either larger or small hands to find a gripping postion that is comfortable for the user's fingers to grasp and guide the drainage valve into threaded engagement with the irrigation pipe and rotatingly secure the drainage valve to an irrigation pipe through hand pressure.

18 Claims, 2 Drawing Sheets

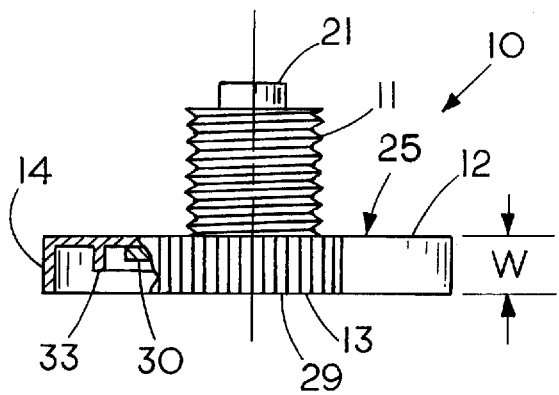
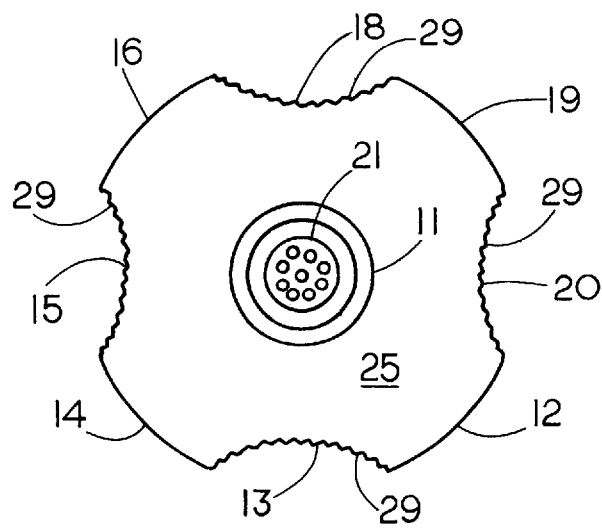
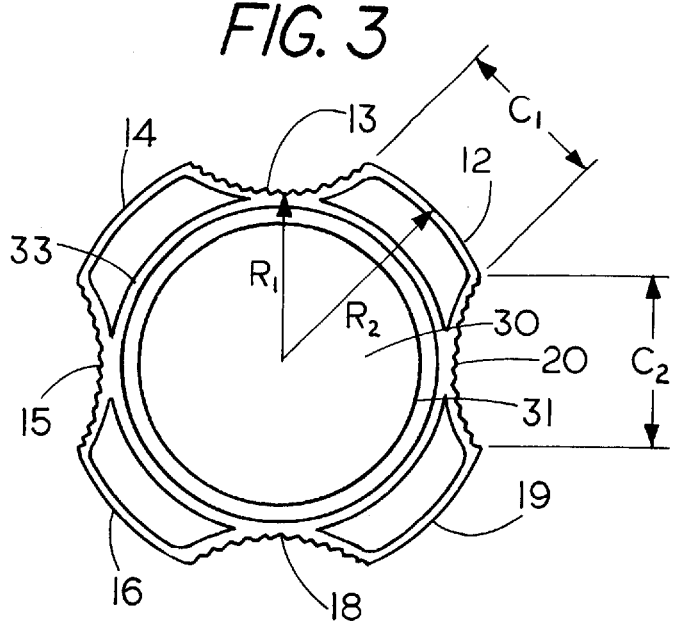

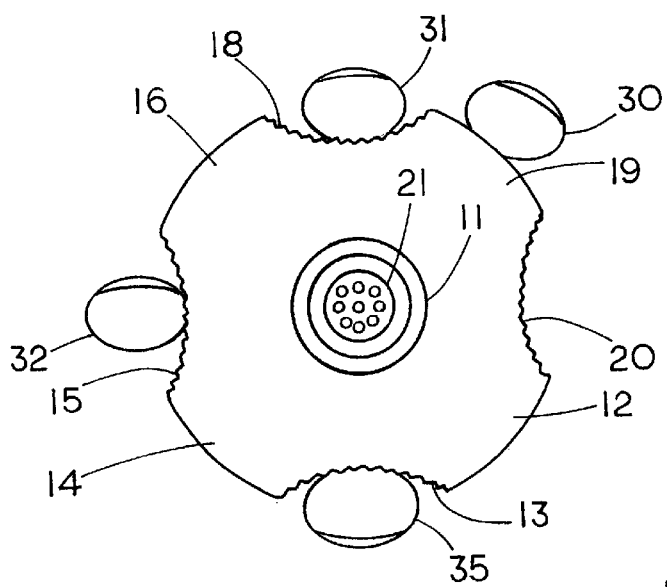
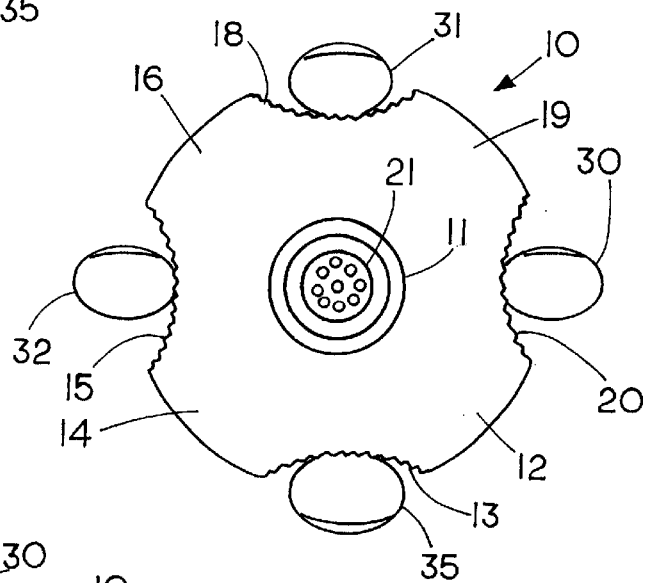
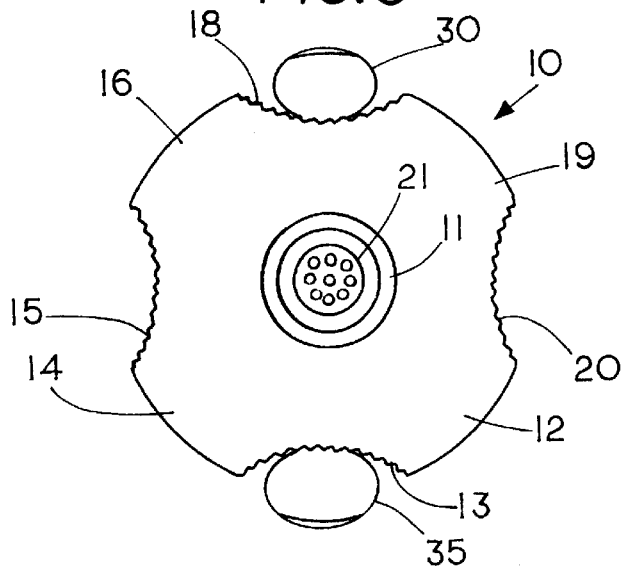

ERGONOMIC HAND ATTACHABLE DRAIN VALVES

CROSS REFERENCE TO RELATED APPLICATIONS

This application claims priority from provisional application 60/136,093 filed May 26, 1999.

FIELD OF THE INVENTION

This invention relaters generally to drain valves and more specifically to an ergonomic irrigation drain valve that include a set of ears and finger reliefs that permit the drainage valve to easily be attached and comfortably secured by persons with either large hands or small hands.

BACKGROUND OF THE INVENTION

The concept of irrigation drain valves is old in the art. One of the earlier drain valves that is attached by threads to a pipe is shown in King Sr. patent U.S. Pat. No. 4,890,640. In patent 4,890,640 a dispersal pad is attached to a flange projecting from the center of the drain valve. Located on the opposite side of the drain valve is a threaded nipple end for engaging a threaded recess. In field installation of these drain valves the user grasps the edges of the circular rim in one hand while guiding the threaded nipple end into a threaded recess in an irrigation pipe. As the outside diameter of the drain valves are generally on the order of about 2 inches in diameter and the size and finger span of users vary it may or may not be equally comfortable or easy for persons of different hand sizes to grasp the edge of the pad area while attempting to guide the nipple into the threaded recess. Once engaged, the operator hand tightens the drain valve by rotating the pad end of the drain valve. To facilitate hand tightening some drain valves have included spike like radial projections on the edged of the housing for the user to engage.

The present invention provides an ergonomic drain valve that is easy to grasp by persons with either small or large hands so that the nipple on the drain valve can be easily guided into the irrigation system and once engaged the drain valve can easily be hand tightened.

DESCRIPTION OF THE PRIOR ART

U.S. Pat. No. 4,953,581 discloses a self drain valve for threadingly engaging a threaded recess with the drain valve having a circular pad housing with radial protrusions thereon for threadingly engaging a threaded recess.

U.S. Pat. No. 4.890,640 discloses a drain valve for threadingly engaging a threaded recess with the drain valve having a circular pad housing and no radial protrusions.

U.S. Pat. No. 3,267,960 shows a drain valve for threadingly engaging a threaded recess with the drain valve having a hexagonal shaped head.

U.S. Pat. No. 5,640,991 shows a drain valve that is spike attached to an irrigation pipe with the drain valve having a circular pad housing

SUMMARY OF THE INVENTION

Briefly, the invention comprises a hand attachable drainage valve having diagonally opposite ears with inwardly curved finger relief areas between the ears to permit a user with either large or small hands to find a gripping postion that is ergonomically comfortable for the user fingers so the user can guide the drainage valve into threaded engagement with an irrigation pipe and then rotatingly secure the drainage valve to an irrigation pipe through hand pressure.

BRIEF DESCRIPTION OF THE DRAWINGS

FIG. 1 is a partial side view of a hand attachable drainage valve;

FIG. 2 is a top view of the hand attachable drainage valve of FIG. 1;

FIG. 3 is a bottom view of the hand attachable drainage valve of FIG. 1;

FIG. 4 is a top view of the hand attachable drainage valve of FIG. 1 held in dominate finger guide postion;

FIG. 5 is a top view of the hand attachable drainage valve of FIG. 1 held by fingers and thumb in the relief areas; and FIG. 6 is a top view of the hand attachable drainage valve of FIG. 1 held between a finger and thumb.

DESCRIPTION OF THE PREFERRED EMBODIMENT

FIG. 1 is a partial side view of a hand attachable drainage valve 10 having a housing 25 with a threaded neck or nipple 11 for engaging a threaded recess in an irrigation pipe. Housing 25 comprises a flange that extends radially outward from the neck to form a support for a circular drain pad 30. A screen 21 is located on the top of neck 11 to prevent dirt from entering into the drainage valve. Housing 25 has a thickness designated by "w" with the thickness sufficient so that a user can comfortably grasp and squeeze the drainage valve as the drainage valve is hand connected to an irrigation system. Typically, housing 25 has a thickness on the order of ¼ of an inch or more. Preferably housing 25 is made from a polymer plastic such as PVC.

FIG. 2 is a top view of the hand attachable drainage valve of FIG. 1 showing the housing 25 with the four protruding ears 12, 14, 16 and 19 with ears 14 and 19 and ears 12 and 16 located diagonally opposite of each other. Each of the ears have an outward curve or convex shape and an outside edge that extends along a radius $R_2$ over a circumferential distance indicated by $C_1$. Located between the ears are a set of inwardly curving finger grasping areas or finger reliefs 13, 15, 18 and 20 with finger relief 13 and 18 and finger relief 15 and 20 located opposite of each other. Each of the finger relief areas have an inward curve or concave shape and an outside edge that curves outward from a radius $R_1$ to the outside radius $R_2$ over a circumferential distance indicated by $C_2$. The finger reliefs are generally characterized by a concave region while the ears are generally characterized by a convex shape so that the housing generally exhibits a square shape. For providing enhanced gripping each of the finger reliefs have parallel, spaced friction ridges 29 thereon. Thus each of ears 12, 14, 16 and 19 form an outer peripheral region of housing 25 which, if desired, can be grasped by a finger of a user and each of finger reliefs 13, 15, 18 and 20 extend along an inner peripheral region of housing 25 to form inwardly curved areas that can be comfortably grasped by a user. Thus the peripheral region of flange 25 is such that there are comfortable finger engaging areas along the entire peripheral region even though the finger reliefs are integral therewith.

FIG. 3 is a bottom view of the hand attachable drainage valve of FIG. 1 showing the drainage pad 30 which is heat sealed to the polymer plastic housing as indicted by ridge 31. A central circular member 33 extends downward around the periphery of the drainage pad. The minimum radius of the finger relief areas 13, 15, 18 and 20 is designated by $R_1$ and the radius of curvature of the ears 12, 14, 16 and 19 are designated by $R_2$ with the radius $R_2$ greater than $R_1$'.

FIGS. 4, 5 and 6 illustrate the multiple gripping postion of ergonomic drain valve 10. FIG. 4 illustrates a three finger and thumb grip with an index finger 30 positioned on ear 19, a first interior finger 31 positioned on relief area 18, a second finger 32 positioned on relief 15 and a thumb 35 positioned on relief 13. The postion shown in FIG. 4 enables the index finger to provide a stronger influence since it is positioned at the larger radius and therefor the torque applied by index finger 30 is enhanced. As the index finger is usually a dominate or more controllable finger it allows the user to provide enhanced guidance in engaging the nipple to the threaded recess. Some users will find this postion a more comfortable hand postion to attach and secure drain valve 10.

FIG. 5 illustrates a second grasping postion wherein index finger 30 engages relief area 20, a first interior finger 31 is positioned on relief area 18, a second relief finger 32 positioned on relief area 15 and thumb 35 engages relief area 35. Some users will find this postion more comfortable to attach and secure drain valve 10 since the fingers are spaced circumferentially around the drain valve.

FIG. 6 shows a third grasping position on drain valve 10 wherein drain valve 10 is supported between index finger 30 and thumb 35 of a user. That is, index finger 30 engages relief area 18 and thumb 35 engages relief area 13. As the curvature of the inward curved relief areas generally match the convex shape of the users finger and thumb, a user with a large hand can grasp the valve with two fingers and quite easily engage the nipple with a threaded recess as well as secure the drain valve to the irrigation pipe. Some users will find this postion a more comfortable postion to attach and secure drain valve 10 since only a finger and thumb are used to secure the drain valve.

Thus it will be appreciated that the drain valve of the provides for multiple hand hold positions to provide the most ergonomic grip for a users hand. Consequently, even large or small hands can easily and comfortably engage and secure the drain valve to an irrigation pipe. It should be pointed out that an irrigation field may contain hundreds of drain valves and reducing the hand and wrist stress in application of the drain valves is welcomed by those in the field.

In summary, in operation of the drainage valve the user grasp the finger relief areas or the ears with the fingers of one hand and guides the nipple end 11 into threaded engagement with a connector on an underground water system. The width and spacing of the finger relief areas allow a person to adopt a hand postion that enable the user to easily grasp and twist the drainage valve so that the drainage valve can be finger tightened onto the connector. It should be pointed out that while four finger relief areas and four ears are included more or less ears or finger relief areas could be used with the drain valve; however, for the most ergonomically adaptable it is preferred to have at least two finger relief areas.

I claim:

1. A hand attachable drainage valve comprising:
    a neck, said neck having a threaded section for engaging with a mating member;
    a housing, said housing connected to said neck, said housing having a water distribution pad therein for dispersing water therefrom when placed underground;
    a set of ears on said housing, said ears protruding radially outward from said housing, said ears extending partially along a first peripheral portion of said housing and at a radial distance $R_2$ from a center of said housing; and
    a set of finger grasping areas located between said ears, said finger grasping areas positioned on a second peripheral portion of said housing, said set of finger grasping areas extending from a first radial distance $R_1$ from a center of said housing to the second radial distance $R_2$ wherein the second radial distance $R_2$ is greater than the first radial distance $R_1$ to enable a person to grasp the housing in one hand with at least one of a users fingers positioned either on an ear or on one of said set of finger grasping areas so that the drainage valve can be axially guided into and secured to a pipe line for underground burial thereof.

2. The hand attachable drainage valve of claim 1 wherein said housing includes four ears with at least two of said ears located diagonally opposite of each other.

3. The hand attachable drainage valve of claim 1 wherein the finger grasping areas include friction ridges.

4. The hand attachable drainage valve of claim 3 wherein the finger grasping areas have a concave curvature thereto.

5. The hand attachable drainage valve of claim 1 wherein the finger grasping areas have a width of at least 3/16 of an inch to allow a user to comfortably exert pressure thereagainst.

6. The hand attachable drainage valve of claim 1 including at least two finger grasping areas located on opposite sides of said housing.

7. The hand attachable drainage valve of claim 1 wherein the drainage valve is a polymer plastic.

8. The hand attachable drainage valve of claim 1 wherein the ears and the finger grasping areas form a generally square shaped housing.

9. The hand attachable drainage valve of claim 1 wherein the housing has a recess therein with said drainage valve pad located therein.

10. The hand attachable drainage valve of claim 1 wherein the finger grasping areas comprise a set of parallel ridges extend parallel to a central axis through said drainage valve.

11. An ergonomic hand attachable drainage valve comprising:
    a neck, said neck having a section for engaging with a mating member;
    a flange extending outward from said neck, said flange having a first peripheral region and a second peripheral region,
    a set of ears located on a said first peripheral region, said set of ears integral with said flange and protruding radially outward from said flange, said ears extending partially along a first peripheral portion of said first peripheral region of said flange and at a radial distance $R_2$ from a center of said flange; and a set of finger grasping areas, said finger grasping areas positioned on a second peripheral portion of the second peripheral region, said set of finger grasping areas extending outwardly a first radial distance $R_1$ from a center of said housing wherein the second radial distance $R_2$ is grater than the first radial distance $R_1$ to enable a person to grasp the flange in one hand with at least one of a users fingers positioned either on an ear or on one of said set of finger grasping areas so that the drainage valve can be guided and secured.

12. The hand attachable drainage valve of claim 11 wherein said flange includes four ears with at least two of said ears diagonally opposite from each other.

13. The hand attachable drainage valve of claim 12 wherein the finger grasping areas include friction ridges.

14. The hand attachable drainage valve of claim 13 wherein the finger grasping areas have a concave curvature thereto.

15. The hand attachable drainage valve of claim 14 including at least two finger grasping areas located on opposite sides of said flange.

16. The hand attachable drainage valve of claim 15 wherein the drainage valve is polymer plastic.

17. The hand attachable drainage valve of claim 16 wherein the housing has a recess therein with said drainage valve pad located therein.

18. The hand attachable drainage valve of claim 17 wherein the finger grasping areas included a set of parallel ridges extend parallel to a central axis through said drainage valve.

* * * * *